(12) United States Patent
Subramanian et al.

(10) Patent No.: US 11,228,459 B2
(45) Date of Patent: Jan. 18, 2022

(54) ANYCAST ADDRESS CONFIGURATION FOR EXTENDED LOCAL AREA NETWORKS

(71) Applicant: DELL PRODUCTS L.P., Round Rock, TX (US)

(72) Inventors: Save Balasubramaniam Subramanian, Chennai (IN); Muralidharan Pennagaram Rajaram, Chennai (IN); Kishore Yetikuri, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/664,491

(22) Filed: Oct. 25, 2019

(65) Prior Publication Data

US 2021/0126812 A1 Apr. 29, 2021

(51) Int. Cl.
*G06F 15/173* (2006.01)
*H04L 12/46* (2006.01)
*H04L 29/12* (2006.01)

(52) U.S. Cl.
CPC ...... *H04L 12/4633* (2013.01); *H04L 12/4641* (2013.01); *H04L 61/2069* (2013.01); *H04L 61/6022* (2013.01)

(58) Field of Classification Search
CPC ............. H04L 12/4633; H04L 12/4641; H04L 61/2069; H04L 61/6022
See application file for complete search history.

(56) References Cited

U.S. PATENT DOCUMENTS

| | | | |
|---|---|---|---|
| 9,282,033 B2 | 3/2016 | Devireddy et al. | |
| 9,716,687 B2 | 7/2017 | Rao et al. | |
| 10,341,236 B2 | 7/2019 | Boutros et al. | |
| 2010/0074144 A1* | 3/2010 | Yao | H04L 12/18 370/254 |
| 2011/0116509 A1* | 5/2011 | Moreno | H04L 45/28 370/401 |
| 2013/0182651 A1* | 7/2013 | Kelkar | H04L 61/2046 370/329 |
| 2013/0266019 A1* | 10/2013 | Qu | H04L 49/70 370/395.53 |

(Continued)

OTHER PUBLICATIONS

RFC 1997 "BGP Communities Attribute" (Network Working Group, Chandra et al., Aug. 1996).

(Continued)

*Primary Examiner* — Padma Mundur
(74) *Attorney, Agent, or Firm* — Joseph Mencher

(57) ABSTRACT

Anycast address configuration on thousands of VXLANs (Virtual eXtensible LANs) or other types of extended LANs can be performed automatically. If an anycast address is configured on one VXLAN gateway or VTEP (Virtual Tunnel End Point), the VTEP sends the anycast address to other VTEPs, possibly together with a VXLAN identifier (e.g. Virtual Network Identifier, or VNI), and the other VTEPs automatically configure the anycast address on their interfaces in the VXLAN. If a VTEP receives conflicting anycast addresses, the VTEP resolves the conflict to select an anycast address according to a predefined rule. All VTEPs may use the same conflict resolution rule, so the same anycast address is installed at each VTEP despite the conflict. Other features are also provided.

20 Claims, 5 Drawing Sheets

(56) References Cited

U.S. PATENT DOCUMENTS

| | | | |
|---|---|---|---|
| 2014/0376550 A1* | 12/2014 | Khan | H04L 45/66 370/392 |
| 2017/0171056 A1* | 6/2017 | Dong | H04L 45/66 |
| 2017/0317919 A1* | 11/2017 | Fernando | H04L 41/0806 |
| 2018/0097734 A1* | 4/2018 | Boutros | H04L 12/4633 |
| 2018/0324140 A1* | 11/2018 | Cao | H04L 61/2061 |
| 2020/0067812 A1* | 2/2020 | Malhotra | G06F 16/2272 |
| 2020/0067830 A1* | 2/2020 | Malhotra | H04L 63/0272 |

OTHER PUBLICATIONS

RFC 3031 "Multiprotocol Label Switching Architecture" (Network Working Group, Rosen et al., Jan. 2001).

RFC 4271, "A Border Gateway Protocol 4 (BGP-4)", Network Working Group, Rekhter et al., Jan. 2006.

RFC 4364 "BGP/MPLS IP Virtual Private Networks (VPNs)" (Network Working Group, Rosen et al., Feb. 2006).

RFC 7209 "Requirements for Ethernet VPN (EVPN)" (Internet Engineering Task Force, Sajassi et al., May 2014).

RFC 7348, "Virtual extensible Local Area Network (VXLAN): A Framework for Overlaying Virtualized Layer 2 Networks over Layer 3 Networks" (IETF, Mahalingam et al., Aug. 2014).

RFC 7432, "BGP MPLS-Based Ethernet VPN" (Internet Engineering Task Force, Sajassi et al., Feb. 2015).

"Active-Active Bridging and VRRP over IRB Functionality Overview", Juniper Networks, Aug. 2018.

"Cisco Nexus 9000 Series NX-OS VXLAN Configuration Guide, Release 7.x: Configuring VXLAN BGP EVPN", (Cisco, 2017).

"Deploy a VXLAN Network with an MP-BGP EVPN Control Plane" (Cisco, White Paper, 2015).

"Example: Configuring the MAC Address of an IRB Interface", Juniper Networks, Sep. 2019, Ethernet Switching Feature Guide: Chapter 18, p. 1-38, 531-539.

"Network Configuration Example: Configuring EVPN for IRB Virtual Gateway Support in EVPN-VXLAN Deployments for MX Series Routers" (Juniper Networks, 2017).

"VXLAN Network with MP-BGP EVPN Control Plane Design Guide" (Cisco, 2016).

"VXLAN Overview: Cisco Nexus 9000 Series Switches" (Cisco, 2015).

* cited by examiner

ANYCAST ADDRESS CONFIGURATION FOR EXTENDED LOCAL AREA NETWORKS

BACKGROUND

The present disclosure relates to computer networks, and more particularly to anycast address management in extended Local Area Networks (LANs).

Local Area Networks have limited geographical size, but are popular because they are fast and are easy to manage. Wide Area Networks (WANs) may have a larger size, but are slower, and may require more network management, needed to configure the WAN routers for example. Due to LAN advantages and easily available hardware and software to meet wide variety of needs, LANs have been extended to large areas by interconnecting different LAN regions via a WAN. An exemplary extended LAN is a VXLAN architecture described in RFC 7348, "Virtual eXtensible Local Area Network (VXLAN): A Framework for Overlaying Virtualized Layer 2 Networks over Layer 3 Networks" (IETF, Mahalingam et al., August 2014), incorporated herein by reference.

In a VXLAN network, individual LAN regions are connected to gateways that communicate with each other via tunnels through an IP network. The tunnels terminate at Virtual Tunnel End Points (VTEPs) provided by the gateways. The gateways have interfaces connected to LAN regions, and have other interfaces connected to the IP network.

In some VXLAN implementations, the VTEP interfaces connected to the LAN regions are assigned the same, anycast address. See e.g. "VXLAN Network with MP-BGP EVPN Control Plane Design Guide" (Cisco, 2016). If a network node or virtual machine (VM) in one LAN region sends data to a VTEP (for forwarding to another LAN region or outside the VXLAN network), the network node or machine specifies the anycast address. Since the anycast address is the same in each LAN region, the network nodes or VMs do not need to be configured with a new VTEP address when moving from one LAN region to another. Therefore, moving between the LAN regions is facilitated.

SUMMARY

This section summarizes some features of the invention. Other features are described in the subsequent sections. The invention is defined by the appended claims.

Configuring an anycast address in a large extended LAN, possibly having hundreds of VTEPs, is a time-consuming and error prone task for a human network administrator. Some embodiments of the present disclosure facilitate anycast address configuration in VXLANs or other types of extended LANs. For example, in some embodiments, if an anycast address is configured on one VTEP, the VTEP sends the anycast address to other VTEPs, and the other VTEPs automatically configure the anycast address on their interfaces connected to the LAN regions. If a VTEP receives conflicting anycast addresses from an administrator or other VTEPs, the VTEP resolves the conflict to select an anycast address according to a predefined protocol. In some embodiments, all VTEPs use the same conflict resolution protocol, so the same anycast address is installed at each VTEP despite the conflict. (In this disclosure, the phrases "configure an address on an interface" and "install an address on an interface" are synonymous, and denote causing an interface to have said address.)

The invention is not limited to the features described above. Other features of the invention are described below. The invention is defined by the appended claims.

DETAILED DESCRIPTION

Figure 1:
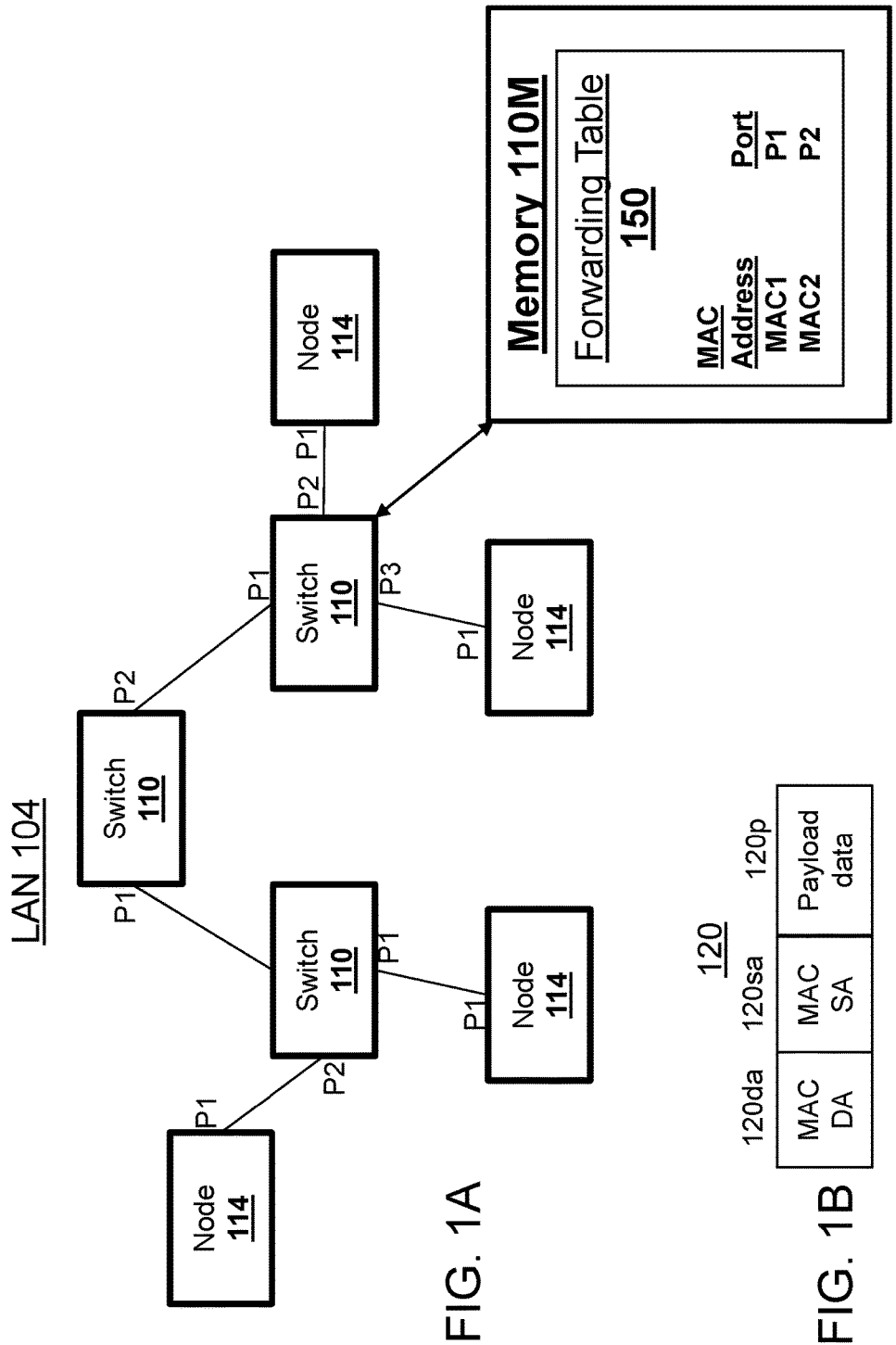
FIG. 1A is a schematic view of a network embodiment.
FIGS. 1B and 1C are schematic views of network data frames.

FIG. 1A illustrates a LAN 104, where network switches 110 interconnect network nodes 114. A node 114 can be a computer, a printer, a telephone, or some other device, possibly a switch or router of another network. Each node 110, 114 includes one or more ports Pi (P1, P2, . . . ) that are assigned MAC addresses. ("MAC" stands for Media Access Control; MAC addresses are also called layer-2 addresses or data link layer addresses.) The MAC addresses can be hardwired into the port circuitry or logically assigned. Switches 110 forward data frames 120 (FIG. 1B) based on the frames' destination MAC addresses 120$da$. Data frame 120 also includes source MAC address 120$sa$ and payload 120$p$. Each switch 110 stores, in its memory 110M, a forwarding table 150 that maps a MAC address to a port Pi through which the MAC address is reachable. When a data frame 120 arrives, the switch looks up the frame's destination address 120$da$ in table 150, and forwards the frame on the corresponding port Pi. If the forwarding table does not have a port for the destination address 120$da$, the switch floods the frame on all the ports Pi except the ingress port, i.e. the port on which the frame was received.

The switch populates the forwarding table 150 using a number of techniques, including MAC learning based on the source addresses 120$sa$: if, for example, the switch receives a data frame with a source address MAC1 on a port P1, the switch associates the address MAC1 with the port P1 in table 150. This is called "data plane" learning, because the addresses are learned from the data traffic and not from management frames (control frames).

Forwarding table 150 has a limited maximum size, and is not suitable for a large network, e.g. the Internet. Large networks use network layer (layer 3) addresses, e.g. IP addresses. Network layer addresses are logical addresses, and they can be organized to assign a range of consecutive addresses to a subnet. Within the subnet, the ports Pi have the same layer-3 address prefix. Hence, packets can be forwarded to the subnet (to the subnet's edge router) based on the address prefix. The forwarding table size is therefore reduced.

Also, in a layer-3 network, flooding can be reduced by using control-plane address-learning techniques (routing protocols), such as OSPF, RIP, BGP, and others.

However, LANs are often faster, and are easier to manage, than layer-3 networks. Therefore, there is a demand to use LAN technology in large networks.

One factor increasing LAN popularity is the ease and efficiency of network virtualization. If a network operator (e.g. operating a data center or cloud) provides network services to multiple tenants (clients), the operator could provide a separate LAN for each tenant, but it is more economical to use the same LAN 104 for multiple tenants if different tenants' data can be isolated from each other. Tenant isolation can be accomplished by defining virtual LANs (VLANs) in a LAN. A data frame 120 (FIG. 10) can be modified to include a VLAN ID 120vid of the corresponding VLAN. Each tenant is assigned a separate VLAN or separate set of VLANs. The data frames are forwarded based not only on destination addresses 120da but also on VLAN IDs. Each VLAN looks like a separate LAN to the tenant.

Figure 2:
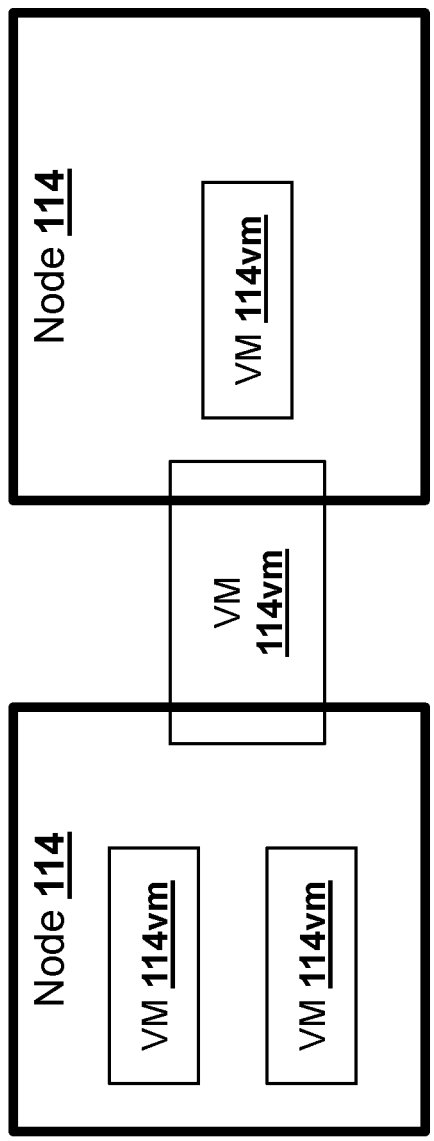
FIG. 2 is a schematic view of physical and virtual machines.

Also, rather than using separate nodes 114 or separate servers for each tenant, the network operator may create a Virtual Machine (VM) 114vm, shown in FIG. 2, which emulates a physical node 114 or a server. Multiple VMs can run on the same physical node 114, or a VM can be distributed among multiple physical nodes 114, allowing optimal use of the LAN's physical resources. However, communicating with VMs 114vm involves additional overhead compared to communicating with a physical node 114. But such overhead is typically lower in layer-2-based virtualization than layer-3-based virtualization. This further increases demand for extended LANs.

Figure 3:
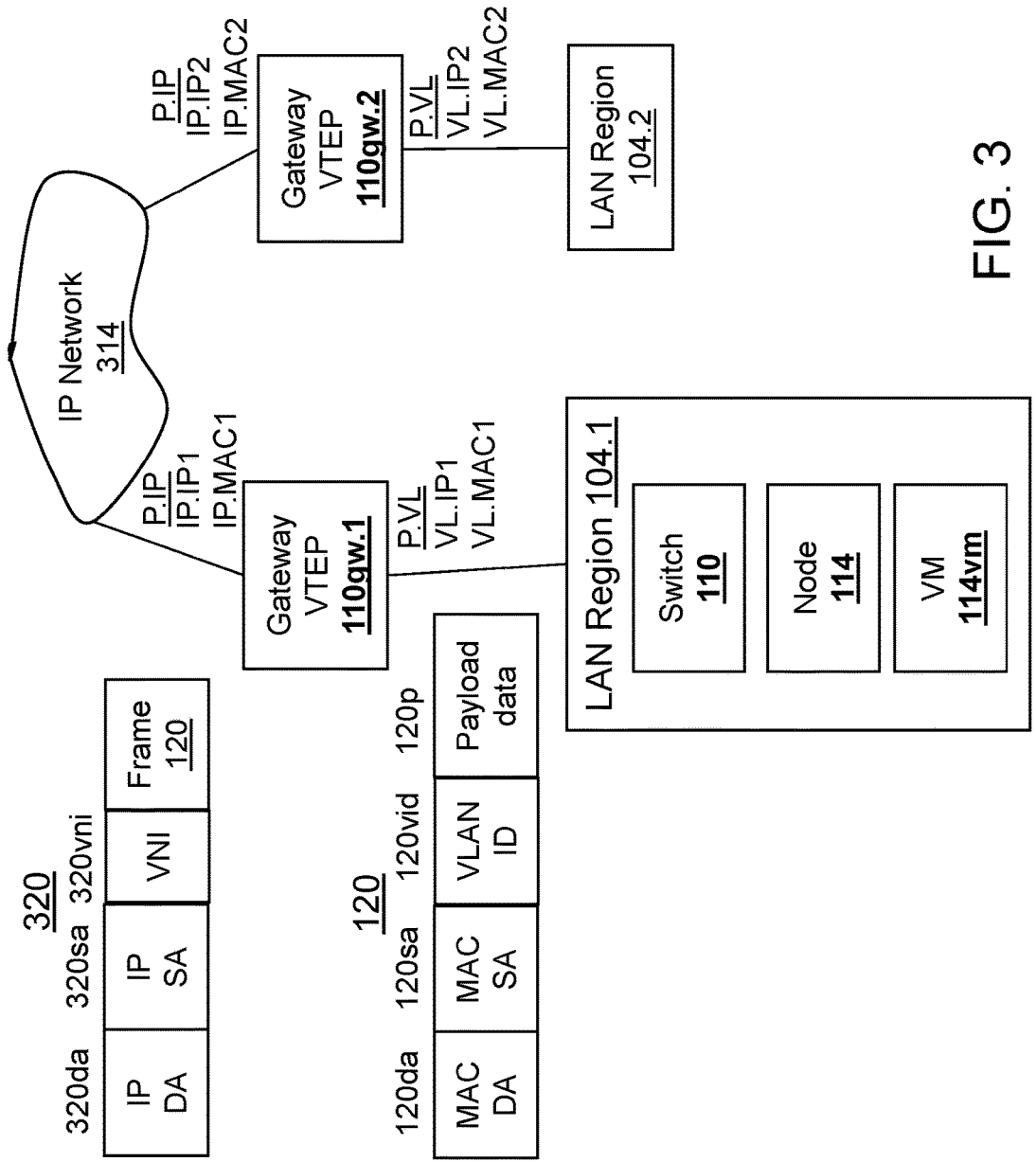
FIG. 3 is a schematic view of a network embodiment.

FIG. 3 illustrates a virtual extended LAN (VELAN) network 310, in which the individual LAN regions 104 (104.1, 104.2, . . . ) are interconnected by IP network 314 so that the LAN regions, combined, can be viewed as a single LAN. In particular, data frames 120 can be forwarded, both within a LAN region 104 and between the LAN regions, based on MAC addresses 120da. The combined LAN is said to form an "overlay" network over "underlay" IP network 314. VELAN examples include VXLANs described in the aforementioned RFC 7348. See also the following publications all of which are incorporated herein by reference: RFC 7432, "BGP MPLS-Based Ethernet VPN" (Internet Engineering Task Force, Sajassi et al., February 2015); U.S. Pre-Grant Patent Publication US 2017/0317919 (inventors: Fernando et al.), published Nov. 2, 2017; U.S. Pat. No. 10,341,236 (inventors: Boutros et al.), issued Jul. 2, 2019; "VXLAN Overview: Cisco Nexus 9000 Series Switches" (Cisco, 2015); and "VXLAN Network with MP-BGP EVPN Control Plane Design Guide" (Cisco, 2016).

In VELAN network 310, each LAN region 104 may be as in FIG. 1A, and may support VLAN functionality. Gateways 110gw.i (110gw.1, 110gw.2, . . . ) connect the respective LAN regions 104.i to IP network 314, that forwards packets based on the gateways' IP addresses.

Each gateway 110gw has one or more interfaces P.IP connected to IP network 314, and one or more interfaces P.VL connected to one or more LAN regions 104. In FIG. 3, each gateway 110gw.i has a single P.IP interface, and has a single P.VL interface connected to a single LAN region 104.i, but this example is for ease of illustration and is not limiting. In particular, a LAN region 104 may connect to multiple P.VL interfaces of the same and/or different gateways 110gw, and a gateway 110gw may have multiple P.VL interfaces connected to the same and/or multiple LAN regions.

When a gateway 110gw.i receives a frame 120 from LAN region 104.i, and determines, from the frame's destination address 120da (and possibly the VLAN ID 120vid and/or other packet fields), that the destination (110 or 114 or 114vm) is in a different LAN region 104.j, the gateway 110gw.i encapsulates the frame 120 into an IP packet 320, with the IP destination address 320da being the address of gateway 110gw.j, possibly of an interface P.IP of gateway 110gw.j. The IP addresses of interfaces P.IP are shown in FIG. 3 as IP.IP1 for gateway 110gw.1, and IP.IP2 for gateway 110gw.2. (The MAC addresses are shown as IP.MAC1 and IP.MAC2 respectively. The MAC addresses are used for next-hop communications.) Thus, a packet 320 sent by gateway 110gw.1 to gateway 110gw.2 may have the source address 320sa of IP.IP1 and the destination address 320da of IP.IP2.

The gateway 110gw.i sends the packet 320 to gateway 110gw.j via IP network 314. Gateway 110gw.j decapsulates the frame 120 and sends the frame to the destination address 120da in LAN region 104.j.

Each gateway 110gw implements one or more Virtual Tunnel End Points (VTEPs) for the virtual tunnels connecting the gateway's P.IP interfaces to other gateways. Each VTEP 110gw can run on a distributed or non-distributed computer system. We use the same numeral "110gw" for the VTEPs and the gateways. In fact, a VTEP can be viewed as a virtual gateway in VELAN communications.

For virtualization, packet 320 may include a Virtual Network Identifier (VNI) 320vni, similar to VLAN ID, identifying the corresponding virtual extended LAN (VELAN). Each VELAN is a separate layer-2 broadcast domain, and appears as a separate LAN to a tenant. The frames 120 are not allowed to cross VELAN boundaries, except possibly in a controlled manner as defined by the gateways 110gw and/or switches 110. The VNI can be longer than the VLAN ID. For example, for VXLANs, the VNI is 24 bits, while an Ethernet VLAN ID is 12 bits. VTEPs 110gw translate between VLAN IDs and VNIs as needed.

Each VTEP 110gw is configured, possibly by an administrator, to have MAC and/or IP addresses on its P.VL interfaces. For example, in VTEP 110gw.1, the MAC and IP addresses on the P.VL interface are denoted respectively as VL.MAC1 and VL.IP1.

Similarly, in VTEP 110gw.2, the MAC and IP addresses on the P.VL interface are denoted respectively as VL.MAC2 and VL.IP2.

In each LAN region 104, the physical and virtual machines 114, 110, 114vm should store the VLAN interface addresses VL.IP, VL.MAC of one or more VTEPs 110gw in the LAN region, so as to avoid wasteful address learning when a machine needs to communicate with a VTEP. In some systems, all VTEPs' P.VL interfaces are assigned the same, anycast addresses VL.IP, VL.MAC. For example, VL.MAC1 and VL.MAC2 can be the same anycast MAC address (VL.MAC); and VL.IP1 and VL.IP2 can be the same anycast IP address (VL.IP). Therefore, the need to reconfigure the addresses on physical or virtual machines 114, 110, 114vm is reduced or eliminated when the machines move from one LAN region to another.

A VTEP may have multiple P.VL interfaces, connected to the same or different LAN regions 104. If so, all of them may share the anycast MAC address and the anycast IP address.

In some embodiments, different anycast addresses can be assigned for different VELANs, i.e. different VNIs, even on the same physical P.VL interface. A P.VL interface anycast address can be viewed as a VELAN interface address.

A VELAN network may have thousands or millions of VELANs and thousands of VTEPs. Manual configuration of each P.VL interface is a labor-intensive and error-prone task for a human administrator. Therefore, in some embodiments of the present invention, the administrator can configure anycast addresses on just one VTEP, or just one P.VL interface, and the VTEP can advertise the anycast addresses to other VTEPs. If a VTEP 110gw receives inconsistent anycast addresses from other VTEPs and/or administrator, the VTEP resolves the conflict according to some established rule. In some embodiments, all VTEPs use the same rule, to minimize the probability of inconsistent anycast addresses on different P.VL interfaces.

Figure 4:
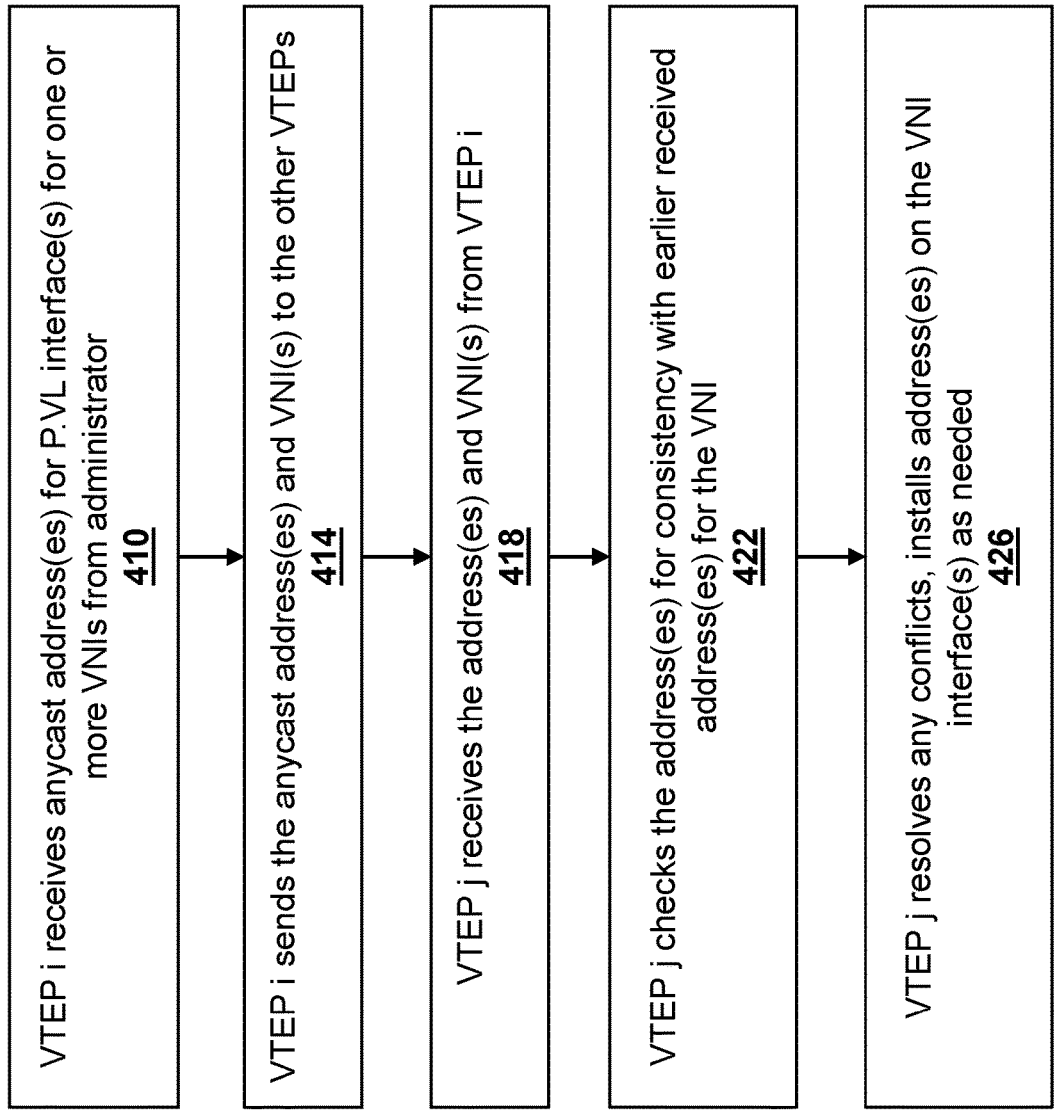
FIG. 4 is a flow chart illustrating an embodiment of a method for anycast address assignment.

FIG. 4 illustrates an exemplary anycast address assignment process. At step 410, a VTEP i (i.e. 110gw.i) receives a command, possibly from an administrator, to configure an address VL.MAC or VL.IP or both on the VTEP's P.VL interface(s). The command may also specify the VNI(s) if the anycast addresses are for one or more specific VNIs. VTEP i configures the address(es) on its interfaces accordingly, possibly after checking for address inconsistencies as described below in connection with step 422.

At step 414, the VTEP i sends a command to all other VTEPs, or at least to those VTEPs whose P.VL interfaces are connected to LAN regions including at least one node in the VELAN(s) specified by the VNI(s). The command commands the VTEPs to configure the P.VL interfaces with the anycast address or addresses received at step 410, for the VNI(s) received at step 410. This command can be sent in any suitable way, e.g. via a unicast transmission to each VTEP, or a multicast transmission. In particular, in some embodiments, the VTEPs or gateways form a multicast group. In some embodiments, a separate group is formed for each VNI. In some embodiments, in each group formed for a VNI, the group membership is reserved only for VTEPs whose corresponding LAN regions have nodes 110 or 114 or 114vm in the corresponding VELAN. Other embodiments have just one multicast group, that includes all VTEPs. Exemplary multicast protocols include bidirectional PIM (Protocol Independent Multicast) or PIM-SM (sparse mode). Other VTEP-to-VTEP communication schemes are also possible.

At step 418, each VTEP j receives the command of step 414. Each VTEP j may install the anycast address(es) for the specified VNI(s) on all of its P.VL interface(s), or at least on those interfaces that handle traffic in one or more of the specified VNI(s).

In some embodiments, before installing the anycast addresses, the VTEP j checks, at step 422, whether any received anycast address is inconsistent with other anycast addresses that the VTEP j may have received for the P.VL interface for the same VNI(s). VTEP j may have received the other addresses from an administrator (as in step 410) or another VTEP (as in step 418). In some embodiments, the other addresses are ignored if they were received some time ago greater than some time-to-live configured on the VTEP, e.g. 10 minutes. In other embodiments, each command from an administrator (step 410) or a VTEP (step 414) is time stamped, and at step 422 the VTEP j ignores the commands with time stamps older than the most recent time stamp by a predefined time-to-live value.

If a conflict exists, the VTEP j resolves the conflict using any suitable rule, possibly the same rule for all VTEPs. For example, a conflict can be resolved by selecting the lowest address. For example, suppose VTEP j received two or more different addresses VL.IP for the same VNI. Then the lowest of the VL.IP addresses can be selected. Alternatively, the highest address can be selected. In some embodiments, if the selected VL.IP address was received together with a VL.MAC address, then this VL.MAC address is configured for the P.VL interface. Alternatively, a separate check is made by VTEP j as to whether there are conflicting VL.MAC addresses, and if so then a VL.MAC address is selected using some predefined rule, the same for all VTEPs, e.g. as the lowest or highest of the conflicting VL.MAC addresses. In still another example, the IP.MAC address is selected first, and if the selected VL.MAC address was received together with a VL.IP address, then this VL.IP address is configured on the P.VL interface.

Other conflict resolution techniques are possible.

In some embodiments, the VL.MAC address is anycast but the VL.IP addresses are not, or vice versa.

Inter-VTEP communication for step 414 (anycast address advertisement) can be performed using any suitable protocol. Some embodiments use a modified BGP advertisement, e.g. using a modified EVPN (Ethernet Virtual Private Network) advertisement. EVPNs are described in the aforementioned RFC 7432. In particular, BGP requires participating routers to advertise Network Layer Reachability Information (NLRI) which defines routes available through the advertising router. These routes specify IP address prefixes reachable via the advertising router. See RFC 4271, "A Border Gateway Protocol 4 (BGP-4)", Network Working Group, Rekhter et al., January 2006, incorporated herein by reference. The BGP EVPN specification of RFC 7432 defines additional NLRI routes, advertised by a gateway 110gw to specify IP and MAC addresses reachable via the advertising gateway in LAN regions 104. A modified NLRI can be used to specify the anycast addresses for the P.VL interfaces; such NLRI, transmitted at step 414, does not advertise any routes but merely informs the other VTEPs of the anycast addresses.

The BGP EVPN VTEPs communicate via TCP, so the NLRIs are transmitted in TCP payloads. A suitable NLRI for an anycast address advertisement is shown in Table 1. This format is similar to the NLRI for the EVPN Type-2 route, also called "MAC/IP Advertisement Route" in RFC 7432. Most fields are conventional or "don't care". A new extended community attribute can be added to specify that this Mac/IP is anycast address and need to be installed for the pertinent VNI. The "Mac Address" and "IP Address" fields can carry the anycast addresses. A BGP advertisement (a message of type UPDATE) may carry multiple NLRIs. Therefore, multiple anycast addresses, for respective multiple VNIs, can be transmitted in a single BGP advertisement.

TABLE 1

NLRI Structure for Anycast Address Advertisement

| NLRI Field | Comment |
| --- | --- |
| Route Descriptor | |
| Ethernet Segment Identifier | |
| Ethernet Tag ID | |
| MAC Address Length | Length of Anycast MAC Address VL.MAC |
| MAC Address | Anycast MAC Address VL.MAC |
| IP Address Length | Length of Anycast IP Address VL.IP |
| IP Address | Anycast IP Address VL.IP |
| MPLS Label1 | |
| MPLS Label2 | |

Embodiments of the present invention can be implemented using a wide variety of computer systems for physical and/or virtual nodes 110, 114, 110vm, 110gw. A computer system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, this may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 5:
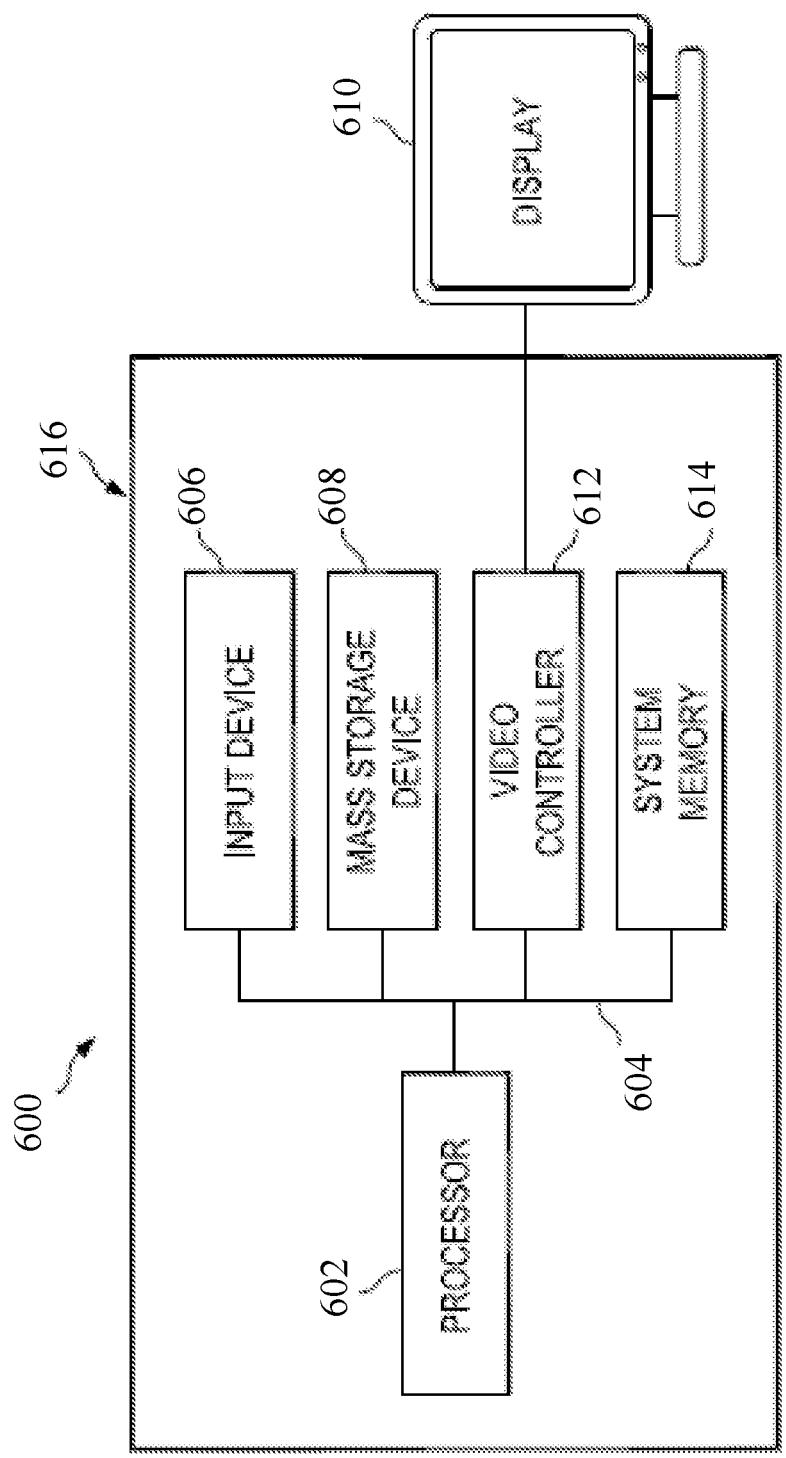
FIG. 5 is a schematic view of a computer system.

One suitable computer system architecture is illustrated in FIG. 5 at 600. In one embodiment, system 600 includes a processor (or processors) 602 connected to a bus 604. Bus 604 serves as a connection between processor 602 and other components of system 600. An input device 606 is coupled to processor 602 to provide input to processor 602. Examples of input devices may include keyboards, touchscreens, pointing devices such as mouses, trackballs, and trackpads, and/or a variety of other input devices known in the art. Programs and data (e.g. name server 210, zone module 210M, and their respective databases) are stored on a mass storage device 608 (including possibly at least part of memory 110M of FIG. 1A), which is coupled to processor 602. Examples of mass storage devices may include hard discs, optical disks, magneto-optical discs, solid-state storage devices, and/or a variety other mass storage devices known in the art. System 600 further includes a display 610, which is coupled to processor 602 by a video controller 612. A system memory 614 (including possibly at least part of memory 110M of FIG. 1A) is coupled to processor 602 to provide the processor with fast storage to facilitate execution of computer programs (including possibly the name server and zone module programs) by processor 602. Examples of system memory may include random access memory (RAM) devices such as dynamic RAM (DRAM), synchronous DRAM (SDRAM), solid state memory devices, and/or a variety of other memory devices known in the art. In an embodiment, a chassis 616 houses some or all of the components of system 600. It should be understood that other buses and intermediate circuits can be deployed between the components described above and processor 602 to facilitate interconnection between the components and the processor 602.

The invention covers a non-transitory computer readable medium (e.g. compact disk, flash memory, or other type) comprising one or more computer instructions which, when executed by a processor or processors of system 110 or 110gw or 114, cause the system to perform the methods within the scope of the present invention. The instructions can be stored in the system's memory.

Although illustrative embodiments have been shown and described, a wide range of modification, change and substitution is contemplated in the foregoing disclosure and in some instances, some features of the embodiments may be employed without a corresponding use of other features. The invention is not limited to virtual LANs or servers or nodes: in some embodiments, no virtual networks or VMs are defined. Other variations are also possible.

What is claimed is:

1. A method for configuring anycast addresses, comprising:
   receiving, by a first gateway that is included in a plurality of gateways that each have an interface in a Local Area Network (LAN) region of an extended LAN having a plurality of LAN regions that are configured to communicate with each other via the plurality of gateways, a first communication including a first anycast address;
   configuring, by the first gateway, the first anycast address on the interface on the first gateway;
   sending, by the first gateway, a second communication including the first anycast address to two or more second gateways that are included in the plurality of gateways;
   selecting, by each of the two or more second gateways using a common selection criteria that is used by all of the plurality of gateways, the first anycast address over at least one second anycast address that is different than the first anycast address and that was received in at least one third communication from at least one third gateway included in the plurality of gateways; and
   configuring, by each of the two or more second gateways in response to selecting the first anycast address, the first anycast address on the interface on that second gateway.

2. The method of claim 1, wherein each of the first communication and second communication includes a virtual network identifier for a virtual network for which the first anycast address is to be configured.

3. The method of claim 2, wherein the virtual network is a layer-2 network present in the plurality of the LAN regions.

4. The method of claim 1, wherein the second communication is sent using a layer-3 protocol.

5. The method of claim 1, wherein the first anycast address includes a Media Access Control (MAC) address.

6. The method of claim 1, wherein the first anycast address includes a layer-3 address.

7. The method of claim 1, wherein the common selection criteria includes selection criteria that provides for selecting a lowest anycast address.

8. The method of claim 7, wherein the common selection criteria includes selection criteria that provides for selecting a highest anycast address.

9. The method of claim 1, further comprising:
   receiving, at the first gateway from at least one fourth gateway included in the plurality of gateways, a fourth communication that includes a third anycast address that is different than the first anycast address; and
   selecting, by the first gateway using the common selection criteria, the first anycast address over the third anycast address.

10. A method for configuring anycast addresses, the method comprising:
    receiving, by a first gateway from a second gateway, a first communication that includes a first anycast address, wherein the first gateway and the second gateway are included in a plurality of gateways that each have an interface in a Local Area Network (LAN) region of an extended LAN having a plurality of LAN regions that are configured to communicate with each other via the plurality of gateways;

receiving, by the first gateway from a third gateway, a second communication that includes a second anycast address that is different than the first address selecting, by the first gateway using a predefined selection rule that is used by all of the plurality of gateways, the first anycast address over the second anycast address; and configuring, by the first gateway, the first anycast address on an interface included on the first gateway.

11. The method of claim 10, wherein:

the first communication identifies a virtual layer-2 network for the first anycast address; and the second communication identifies the virtual layer-2 network for the second anycast address.

12. The method of claim 10, wherein the first anycast address is a Media Access Control (MAC) address.

13. The method of claim 10, wherein the first anycast address is a layer-3 address.

14. An Information Handling System (IHS), comprising:

a processing system; and a memory system that includes instructions that, when executed by the processing system, cause the processing system to perform operations including:

receiving, from a first gateway that is included in a plurality of gateways that each have an interface in a Local Area Network (LAN) region of an extended LAN having a plurality of LAN regions that are configured to communicate with each other via the plurality of gateways, a first communication that includes a first anycast address;

receiving, from a second gateway that is included in the plurality of gateways, a second communication that includes a second anycast address that is different than the first anycast address;

selecting, using a predefined selection rule that is used by all of the plurality of gateways, the first anycast address over the second anycast address; and configuring the first anycast address on an interface that is coupled to the processing system.

15. The IHS claim 14, wherein the first communication includes a virtual network identifier for a virtual network for which the first anycast address is to be configured, and wherein the second communication includes the virtual network identifier for the virtual network for which the second anycast address is to be configured.

16. The IHS of claim 15, wherein the virtual network is a layer-2 network that overlaps a plurality of LAN regions and that is coupled to the interface.

17. The IHS of claim 14, wherein the second communication is sent using a layer-3 protocol.

18. The IHS of claim 14, wherein the first anycast address includes a MAC address.

19. The IHS of claim 14, wherein the first anycast address includes a layer-3 address.

20. The IHS of claim 14, wherein the predefined selection rule provides for either selecting a lowest anycast address or selecting a highest anycast address.

* * * * *

UNITED STATES PATENT AND TRADEMARK OFFICE
CERTIFICATE OF CORRECTION

PATENT NO. : 11,228,459 B2  
APPLICATION NO. : 16/664491  
DATED : January 18, 2022  
INVENTOR(S) : Subramanian et al.

Page 1 of 1

It is certified that error appears in the above-identified patent and that said Letters Patent is hereby corrected as shown below:

On the Title Page

Item (72), Inventors: "Save Balasubramaniam Subramanian" should be changed to --Saye Balasubramaniam Subramanian--.

In the Claims

Claim 2, Column 8, Line 29, "includes" should read --include--;
Claim 15, Column 10, Line 10, "The IHS claim 14" should read --The IHS of claim 14--.

Signed and Sealed this
Twenty-ninth Day of March, 2022

Drew Hirshfeld
*Performing the Functions and Duties of the
Under Secretary of Commerce for Intellectual Property and
Director of the United States Patent and Trademark Office*